United States Patent [19]

Pereira et al.

[11] Patent Number: 4,791,090

[45] Date of Patent: Dec. 13, 1988

[54] HYDROPROCESSING CATALYST AND SUPPORT HAVING BIDISPERSE PORE STRUCTURE

[75] Inventors: Joseph Pereira; Wu-Cheng Cheng, both of Columbia, Md.

[73] Assignee: W. R. Grace & Co.-Conn., New York, N.Y.

[21] Appl. No.: 77,066

[22] Filed: Jul. 23, 1987

Related U.S. Application Data

[63] Continuation of Ser. No. 859,104, May 2, 1986, abandoned.

[51] Int. Cl.$^4$ .......................... B01J 21/12; B01J 21/04; B01J 35/10
[52] U.S. Cl. .................. 502/263; 208/216 PP; 502/211; 502/214; 502/255; 502/314; 502/355; 502/439
[58] Field of Search .............................. 502/263, 439

[56] References Cited

U.S. PATENT DOCUMENTS

| | | | |
|---|---|---|---|
| 3,898,322 | 8/1975 | Leach | 423/628 |
| 4,102,822 | 7/1978 | Mulaskey | 252/465 |
| 4,444,655 | 4/1984 | Shiroto | 201/210 |
| 4,493,761 | 1/1985 | Hensley, Jr. et al. | 208/421 |
| 4,497,909 | 2/1985 | Itoh, et al. | 502/263 |
| 4,510,043 | 4/1985 | Oleck et al. | 208/216 PP |
| 4,526,885 | 7/1985 | Day et al. | 502/439 |

Primary Examiner—Paul E. Konopka
Attorney, Agent, or Firm—Edward J. Cabic

[57] ABSTRACT

A catalyst support is made with a bidisperse micropore size distribution. One region has small micropores with an average pore diameter of less than 100 Angstrom units. The other region has large micropores with an average pore diameter which is between 100 and 600 Angstrom units. By adding catalytic metals for desulfurization and demetallation, a hydrotreating catalyst is made which is able to treat heavy feeds containing large metal bearing molecules. In a preferred embodiment the desulfurization metals are placed in the small micropores and the demetallation metals are placed in the larger micropores.

9 Claims, 6 Drawing Sheets

Schematic of bidisperse micropore catalyst

Schematic of bidisperse micropore catalyst

Initial selectivity of hydrotreating catalysts

Comparison of bidisperse microporous catalysts and unimodal unidisperse catalysts of varying micropore diameter Bidisperse microporous supports containing macropores Bidisperse microporous catalysts containing macropores

HYDROPROCESSING CATALYST AND SUPPORT HAVING BIDISPERSE PORE STRUCTURE

This is a continuation of application Ser. No. 859,104, filed May 2, 1986, now abandoned.

BACKGROUND OF THE INVENTION

1. Field of the Invention

This invention relates to a catalyst support with a unique bidisperse micropore size distribution and to the resulting hydroprocessing catalyst which is made from the support and to a process to hydrotreat heavy petroleum feeds.

2. Description of the Previously Published Art

Shiroto et al in U.S. Pat. No. 4,444,655 discuss extensively eight different types of processes for hydrotreating using various kinds of catalysts and point out that none of the processes is satisfactory. Their solution is to use a catalyst having 1-30% by of catalytic metals (1) where the average pore diameter (APD) is from about 180 to 500 Angstrom units, (2) where the minimum total pore volume is calculated by a formula which is dependent on the APD and which has at least 0.35 cc/g of volume in pores from 180 to about 500 Angstrom units and (3) where the total surface area is at least 104 $m^2/g$.

Of interest to the present invention is Shiroto et al's description of processes for hydrodesulfurization and demetallization characterized by using a catalyst having a double peak in its pore volume. This is their prior art process (5) which they say "is based on the fact that in the hydrotreatment of heavy hydrocarbon oils, desulfurization is not very largely influenced by intrapore diffusion, while demetallization is largely affected by it. According to this process, there is used a catalyst provided with both small pores having a diameter not greater than about 100 Angstrom units, and macropores having a diameter of at least about 500 Angstrom units, or even at least about 1,000 Angstrom units. Although this catalyst does certainly relax the limitations relating to the diffusion of metal-containing high molecular compounds into the pores, it shows a sharp reduction in activity due to metal accumulation in the pores having a diameter not greater than about 100 Angstrom units, and the mouths of these pores are likely to be blocked, as is the case with the catalyst used for the group (1) [which is their prior art catalyst with small pores]. Thus, the catalyst for the group (5) fails to maintain a high activity for a long time for the feedstock oil having a high metal content, and eventually, only the larger pores act mainly for demetallization. Therefore, it is not considered to have an improved efficiency over the catalysts for groups (1) and (3) [which is their prior art catalyst with macro pores] which are used individually."

Mulaskey in U.S. Pat. No. 4,102,822 discloses a catalyst composition in the form of a pack of particles with different size particles without reference to the pore size distribution of these particles. There are channels forming interconnected macropores which contribute from 3 to 45 of the pore volume. A further and special advantage of the catalyst is that a mixture of two or more different kinds of particles having different catalytic activities may be used in the preparation of the catalyst pack or cluster therein, thereby yielding a catalyst having bi- or polymodal activity.

OBJECTS OF THE INVENTION

It is an object of this invention to prepare a catalyst support containing a bidisperse distribution. A catalyst having a bidisperse micropore structure has a bimodal pore size distribution in the micropore region.

It is a further object of this invention to prepare a desulfurization and demetallization catalyst containing a bidisperse micropore size distribution.

It is a further object of this invention to hydroprocess heavy feeds by utilizing an improved catalyst having a bidisperse micropore size distribution.

It is a further object of this invention to prepare a catalyst support containing a bidisperse micropore size distribution and a controlled amount of macroporosity.

It is a further object of this invention to prepare a catalyst support containing a bidisperse micropore size distribution wherein different materials are used together to achieve the desired pore diameters.

These and further objects will become apparent as the description of the invention proceeds.

SUMMARY OF THE INVENTION

Catalyst supports and preferred desulfurization and demetallization catalysts are made with a bidisperse micropore size distribution in the micropore region. The pore volumes of the two micropore modes are chosen such that feed molecules can diffuse into the pellet via each of the microporous pathways.

The size of the smaller micropores serves to screen out the larger metal containing molecules from entering the pores according to a "screen door" effect described by Hamner in U.S. Pat. No. 4,051,021. This screen door effect is a phenomenom that permits entry of relatively small molecules such as sulfur into the pores while simultaneously inhibiting the entry of relatively large molecules. In Hamner's patent, the catalyst had only small pores and the larger molecules passed through the reactor virtually untreated. It is the object of the present invention to optimally provide both small and larger micropores within a single catalyst pellet.

The higher surface activity of the small micropore materials will enhance the hydrodesulfurization activity of the catalyst. The smaller micropore region, which screens out the larger metal bearing molecules while allowing entry to the smaller sulfur molecules, typically has an average diameter of less than 100 Angstrom units.

The larger micropores are chosen such that the pore size is equal to or larger than 100 Angstrom units and much larger than the average diameter of the metal bearing molecules. As will be discussed below, the average metal bearing molecules have sizes of 20 Angstrom units or higher as determined, for example, by Gel Permeation Chromatography or Size Exclusion Chromatography with an Inductively Coupled Plasma. Thus larger micropores will result in increased catalyst demetallation activity and life. The larger micropore region has larger micropores where the average diameter is between about 100 and 600 Angstrom units and more preferably between 100 and 250 Angstrom units.

These catalyst supports can be made in the form of formates such as extrudates. As a result there may be larger pores between the grains of the refractory oxide which will serve as macropores.

By adding various known desulfurization metals and demetallization metals in each of the two micropore modes very effective catalysts can be formed for use in hydroprocessing heavy feeds. In one embodiment for making the catalyst support two different types of powders are mixed together. One provides the small micropores and the other provides the larger micropores. In another embodiment either powder can be preloaded with desulfurization and/or demetallation metals.

Although the exact theory of how the catalyst works is not known, perhaps the following analysis will aid in understanding the invention. The large-micropore, low-metals impregnated fraction of the catalyst are thought to allow the metals in the petroleum which are to be removed to access the catalyst internals where they react within the catalyst pores and deposit as metal sulfides. The small-pore alumina fraction impregnated with desulfurization metals such as Co and Mo are considered to provide the necessary desulfurization activity.

DESCRIPTION OF THE PREFERRED EMBODIMENT

Figure 1:
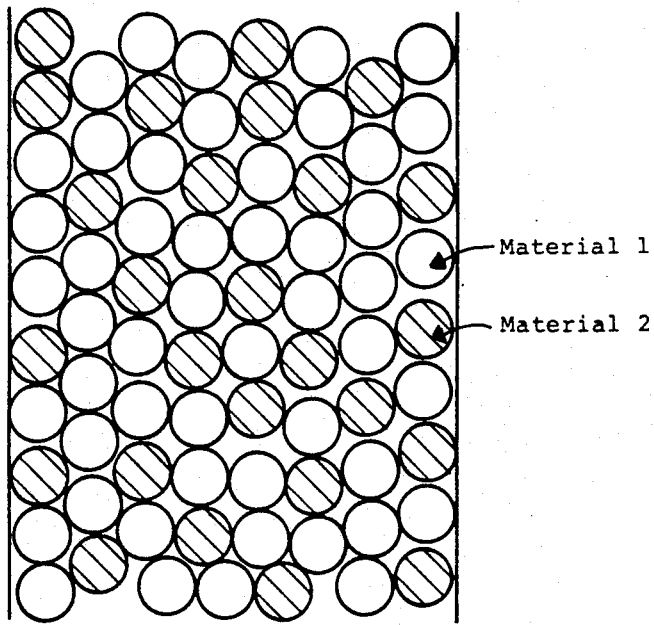
FIG. 1 is a representation of the two types of materials which can make up the catalyst support in a preferred embodiment.

The catalyst support and resulting catalyst is made of two types of micropore materials. As seen in FIG. 1, the small pore micropore material can be designated Material 1 and it preferably has an average pore diameter below about 100 Angstrom units. The larger micropore material is designated Material 2 in FIG. 1 and it is chosen to preferably have a pore diameter much larger than the size of the metal bearing molecules in the heavy feed being treated for desulfurization and demetallization. Since the molecular size distribution for the metal bearing species may range from 20 Angstrom units to as large as 100 Angstrom units, the size of the larger micropore is chosen so that most of the molecules can easily diffuse through. In general the large micropore region should have larger micropores where the average pore diameter is at least five times the average diameter of the metal bearing molecules in a heavy feed to be processed. Preferred average pore diameters are between about 100 and 600 Angstrom units and more preferably between 100 and 250 Angstrom units. The amount of the small micropore material and the large micropore material can each range from 5% to 95% by weight of the total with the more preferred ranges being 30%–70%.

Figure 4:
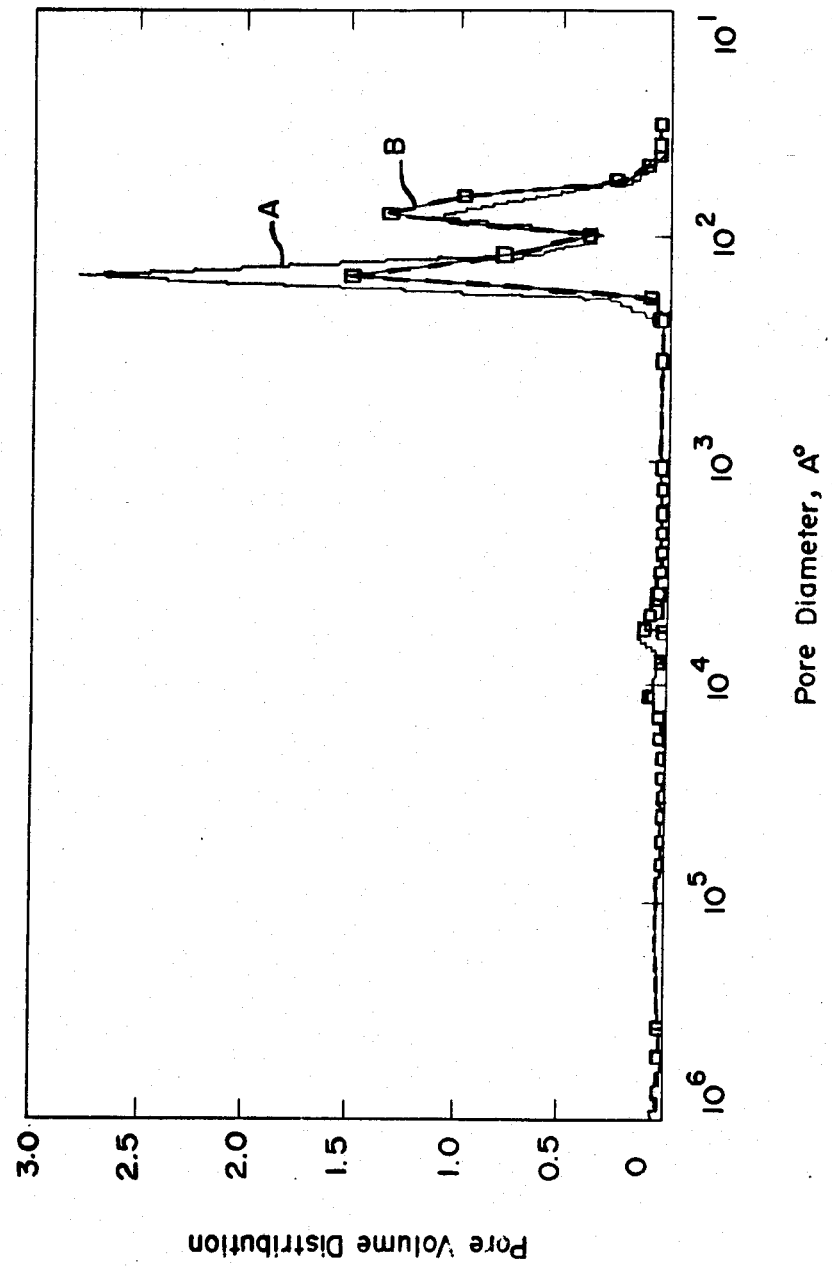
FIG. 4 is a graph illustrating the pore volume distribution versus the pore diameter for the bidisperse micropore size.

Surface area is measured using the BET technique that is standardly practiced in the art. The cumulative pore volume distribution is obtained using Hg porosimetry. In this method, the pressure of Hg is increased and the volume intruded into the sample is measured. The instrument used was a Micromeretics Autopore 9200. The pore volume distribution is obtained by relating the intrusion pressure to diameter (using a contact angle of 140°) and by differentiating the cumulative pore volume distribution. An example of such a distribution is shown in FIG. 4 and consists of two distinctly separated peaks in the micropore region. A point in between the two peaks is identified and the pore volume in each of the micropore modes is obtained. Hg porosimetry is also used to calculate the fractional contribution of each of the micropore modes to the total surface area. For a fraction $alpha_s$ of surface area from smaller micropores, the diameters are calculated as $$d_{smaller\ micropores} = \frac{4 \times V_{smaller\ micropores}}{alpha_s \times (BET\ Surface\ area)}$$

and $$d_{larger\ micropores} = \frac{4 \times V_{larger\ micropores}}{(1 - alpha_s)(BET\ Surface\ Area)}$$

The size of the metals bearing molecules will vary depending on the quality and type of the feedstock treated. For example, using analytical and preparative Gel Permeation Chromatograph at ambient conditions, the average size of the vanadium bearing molecules may be as large as 65 Angstrom units for an Arab Light vacuum resid and 40 Angstrom units for a Wilmington crude (Hall and Herron, Adv. Chem. Ser., 195, 1981, page 149). Processing conditions such as temperature, pressure, and gas composition (as, for example, hydrogen partial pressure) may also effect the size of the metal and sulfur bearing species. The larger asphaltenic molecules are believed to deflocculate at reaction conditions thereby reducing their size. This is evident from the fact that at higher temperatures a larger fraction of the asphaltenes are able to enter the pores of a given catalyst (Richardson and Alley, Prepr. Div. of Petr. Chem., American Chemical Society, Philadelphia, 1975).

Most of the metals are contained in the maltene and asphaltene fractions of the feedstock. The size of the metal bearing species at reaction conditions varies from 20 to 50 Angstrom units. Larger micropore diameters in the range of 100–600 Angstrom units would allow metal molecules to easily access the internals of the catalyst.

Most of the sulfur bearing species in heavy oils are either thiophene, benzothiophene or dibenzothiophene based and have a molecular size of between 6 to 10 Angstrom units. A small fraction of the sulfur may also be present in the asphaltene fraction and have a larger molecule size. Smaller micropore diameters in the range 30–100 Angstrom units would be suitable for the treatment of most of the sulfur species.

The two sizes of micropores can be formulated by various means. For example, one can use different forms of alumina. One form would be made of grains of small micropores while the other form is made of grains of larger micropores. By mixing these two forms together one obtains the desired mixture. As another example, one could take grains of one pore size of alumina and calcine a portion to change its pore size. A third possibility is to use two completely different materials having different pore sizes such as alumina and silica. These grains could then be mulled together and extruded in a manner standardly practiced in the art. Calcination treatment after extrusion could be used to additionally modify the pore structure of the extrudate.

After mixing together the two different size micropore materials they can be extruded to form formates which are formed particles. During the process of extrusion there may be channels between the various grains which form macropores having diameters greater than 600 Angstrom units. Such a resulting catalyst support can be characterized trimodal since it has a bidisperse micropore size characterization with the two different types of micropore regions and it then has this third region of much larger micropores.

To form the catalyst various metals can be added to the catalyst support. Among the conventionally known desulfurization metals are metals of Group VIB such as Cr, Mo and W and Group VIII which include Fe, Co, and Ni in addition to six other members which are Ru, Rh, Pd, Os, Ir and Pt with preferred metals being Mo, W, Ni and Co, with especially preferred metals being Co and Mo. After the Co and Mo are added to the catalyst and calcined it forms CoO and $MoO_3$ and this $MoO_3$ can be present in an amount of 0.1-30% by weight with CoO present in the 0.1-5% by weight range. The demetallization metals include members of Group VIB which are Cr, Mo and W; members of Group VIII as listed above; members of Group VB which are V, Nb and Ta; and members of Group VIIB which are Mn, Tc and Re. Especially preferred metals are Mo as well as other low activity and especially hydrogenation metals such as Fe, Mn, Ni, Co, and W. Again these metal oxides can be present in a weight range of 0.1-30% by weight.

In general it is preferred to have the Mo oxide present in the small micropores in an amount of 8-30% by weight and to have the metal oxide present in the larger micropores in an amount of 0.1-8% by weight. One way to obtain this different level of metal oxide loadings is to impregnate the small micropore grains with desulfurization metals such as Co and Mo and to then separately impregnate the large micropores with either a different material which is a demetallization metal or to a lesser extent.

Another preparation method that may be used is the equilibrium adsorption of metals onto the alumina surface with an excess of impregnation solution. In this case, the Mo loading in each of the grains will be proportional to the local surface area.

Catalysts can also be prepared by the incipient wetness method of impregnation which is standardly practiced in the art.

Catalysts can also be prepared by first forming particles of a refractory oxide powder having a small micropore region having an average pore diameter of less than 100 Angstrom units and a large micropore region having an average pore diameter which is much larger than the average diameter of the metal bearing molecules in a heavy feed to be processed. Then the particles are calcined to form a catalyst support which is impregnated with one or more catalytic metal components selected from the group consisting of a metal belonging to Group VB, VIB, VIIB and VIII of the Periodic Table. These catalytic metal components are present in an amount of between about 0.1% and about 30% in terms of metal oxide based on the total weight of the catalyst.

Another way to make the catalysts is to first impregnate particles of a refractory oxide powder having a small micropore region with an average pore diameter of less than 100 Angstrom units with one or more desulfurization catalytic metal components belonging to Groups VIB and VIII of the Periodic Table. These impregnated particles are then mixed with a refractory oxide powder having a large micropore region with an average diameter which is much larger than the average diameter of the metal bearing molecules in a heavy feed to be processed. The mixture is formed into catalyst particles and the particles are calcined to form a hydrotreating catalyst. In a further modification of this embodiment, after the catalyst particles are formed and before calcination, the catalyst particles can be further impregnated with one or more demetallization catalytic metal components belonging to Groups VB, VIB, VIIB and VIII of the Periodic Table. Then after the calcination the resulting catalyst will have desulfurization metals in the small pores in the proper amount and the demetallization metals in the larger pores.

Catalyst of this invention prepared having less than 5% of pores of diameter greater than 600 Angstrom units are preferred in the treatment of lighter feeds because of increased surface area. Macropores would reduce the active surface area per volume of reactor but may be preferred in cases where high metal levels in the feed may cause external plugging of the catalyst pores.

In addition to extruding the material in conventional cylindrical shapes, it is also possible to extrude in any type of geometrical shape including in the shape of an extrudate support structure having a cylindrical hollow annular configuration with internal reinforcing vanes as disclosed in U.S. Pat. No. 4,510,263.

The catalysts can be used in a process for hydrotreating a heavy hydrocarbon oil containing asphaltenes. Such a process involves preferably reacting the heavy hydrocarbon oil in the presence of the catalyst with hydrogen at a temperature of between 300° and 500° C., with a hydrogen pressure of between 50 and 250 atmospheres and with a liquid space velocity of between 0.1 and 10 hour$^{-1}$.

Although the exact mechanism as to how the present catalyst exhibits such superior results is not known, the following mathematical rationale may provide some theoretical and conceptual explanation. Consider a bidispersed micropore size extrudate made up of grains having two different pore structures and activites but the same total porosity as shown in FIG. 1. The effective diffusion coefficient in each grain is given by $$D_{e,i} = D_i(1 - d_{molecule}/d_{pore,i})^4 \qquad (1)$$

where $D_i$ is the effective diffusion coefficient in the absence of configurational diffusion, d is the pore diameter, and i=micrograin (i=1), macrograin (i=2) or macropore (i=3). The effective diffusion coefficient in the catalyst pellet $$D_{e,pellet} = \epsilon_1 D_{e,1} = \epsilon_2 D_{e,2} + (1 - \epsilon_1 - \epsilon_2) D_{e,3} \qquad (2)$$

where $\epsilon$ is the porosity. The Thiele modulus (defined standardly in chemical reaction engineering) is given as $$\Phi^2 = R^2[(k_1\epsilon_1\eta_1 + k_2\epsilon_2\eta_2)/D_{e,\,pellet}]^{0.5} \qquad (3)$$

where R is the equivalent radius of a spherical pellet and $\eta_i$ is the effectiveness factor, $$\eta_i = l_i(k_i/D_{e,i})^{0.5} \text{ for } i=1,2 \qquad (4)$$

where $l_i$ is the diameter of the grain and $k_i$ is the volumetric rate constant. The conversion at the reactor outlet for a first order reaction rate $$\psi = 1 - \exp[10,800 D_{e,pellet}(1-\epsilon_r)(\Phi \coth \Phi - 1)/(LHSV)(R^2)] \quad (5)$$

where $\epsilon_r$ is the reactor void fraction and LHSV is the liquid hourly space velocity.

Figure 2:
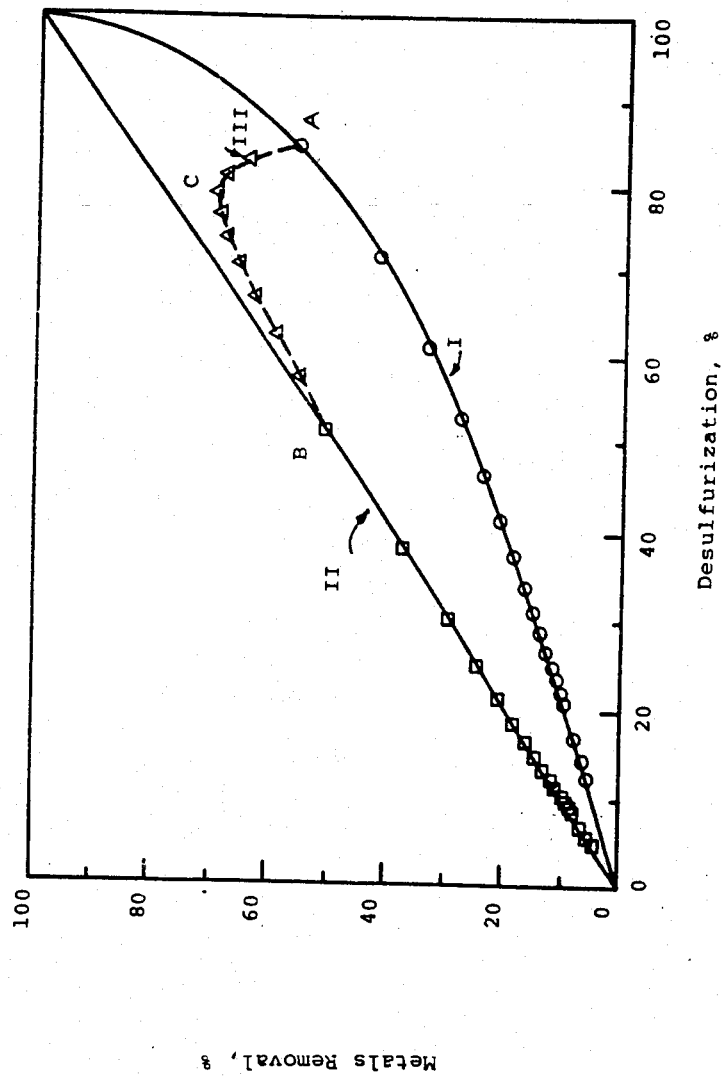
FIG. 2 is a graph illustrating the initial selectivity of hydrotreating catalysts.

Let us assume that the rate constant $k_i$ is proportional to the surface area of the grain. This would typically be the case if the catalysts were prepared using an equilibrium adsorption process with excess impregnation solution. Also, assume that the sulfur containing molecules are 7 Angstrom units in size, that the metal bearing species are 40 Angstrom units in size and that the intrinsic rate constant for both metals and sulfur removal is the same. We can now construct a selectivity diagram as shown in FIG. 2. Curve I in Figure (2) illustrates the initial selectivity performance of a unimodal catalyst having 70 Angstrom units micropores. Curve II in FIG. 2 represents the initial activity of a 200 Angstrom units unimodal catalyst. Points A and B show the initial activity of the small and large pore catalysts at the same LHSV. Curve III (FIG. 2) shows the initial selectivity performance of the catalysts of this invention. The catalysts are prepared by mixing various volume fractions of grains having 70 Angstrom units and 200 Angstrom units pores. Catalyst desulfurization activity decreases as one proceeds from Point A to Point B along Curve III in Figure 2.

However, the demetallation activity is maximum at Point C. A catalyst at point C would contain from 30-40 vol % of the smaller pore material.

Figure 3:
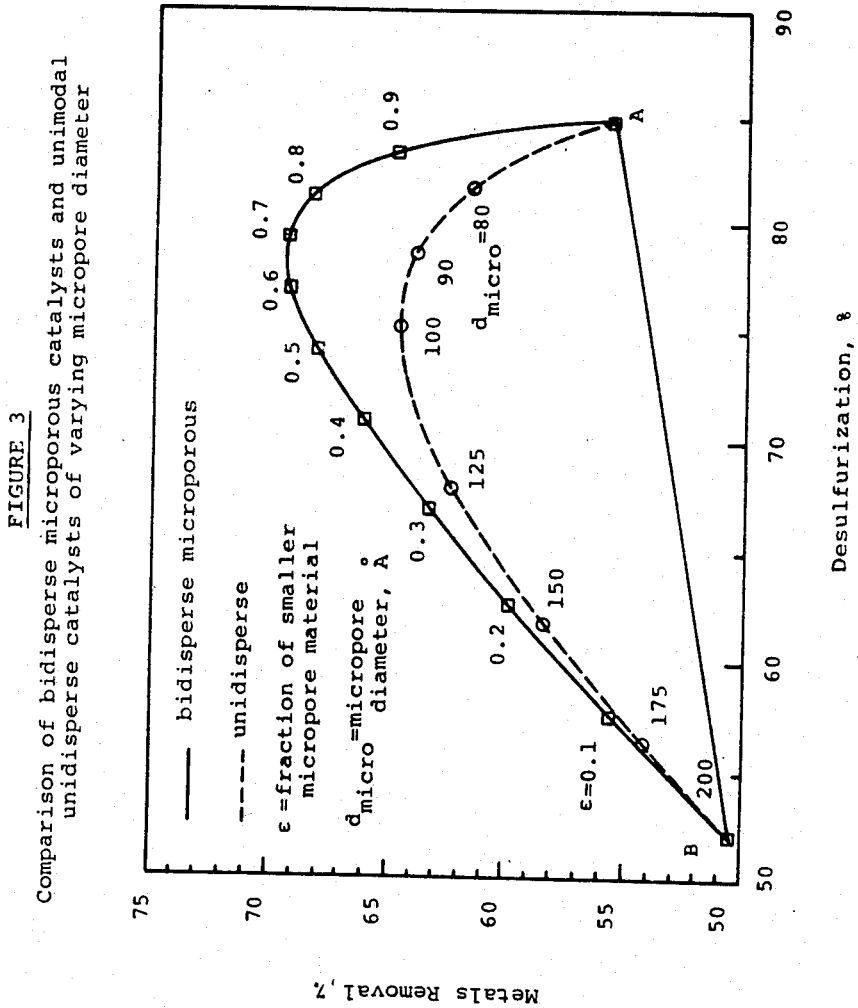
FIG. 3 is a comparison of bidisperse micropore size catalysts and unimodal unidisperse catalysts of varying micropore diameter.

Unimodal catalysts having larger sized micropores can also be prepared for comparison. FIG. 3 compares the initial performance of the catalyst of this invention with that of a unimodal micropore catalyst of varied micropore diameter. The catalyst of this invention represented by the solid line has a higher initial metals removal at a fixed desulfurization level compared with the various unimodal micropore catalysts represented by the dashed line.

We also believe that the catalyst of the invention will have a longer life compared with a catalyst having only the smaller micropores. Since a substantial fraction of pores on the external surface on the catalyst are larger micropores, the time for catalyst deactivation via pore mouth plugging will be comparable to that of a catalyst having only larger micropores.

To illustrate the superior selectivity characteristics of the bidisperse micropore size catalyst, we have compared the performance of such a catalyst with that of unidisperse catalysts having smaller and larger micropore diametes in Examples 5, 6 and 7. As is seen from Tables (4), (5) and (6), the catalyst of the present invention shows superior performance compared with the other unidisperse catalysts.

After having described the superior catalysts according to the present invention and having presented the mathematical model analysis above which supports the unique results that our catalyst can obtain, it is interesting to return to the Shiroto patent on hydrotreating. The Shiroto et al patent divides hyorotreating developments for the removal of sulfur, metals, nitrogen, and asphaltenes fall into eight categories. Neither it, nor any other patents of which we are aware, discuss catalysts with bidisperse micropore size distributions as in the case of the present invention. Shiroto et al's category (3) relates to catalysts with pores greater than 200 Angstrom units which are also the type of pores used in his catalyst. Such catalysts show superior metals and asphaltene removal activity and durability. However, the desulfurization activity of such catalysts is lower because of the lower surface area of the catalyst.

Categories (4) and (5) in the Shiroto et al patent discuss overall bimodal pore size distribution in which the pores greater than 200 Angstrom units serve as access channels into the catalyst. However, the incorporation of such large pores inevitably leads to a decrease in the available alumina surface area per reactor volume and to lower hydrodesulfurization activity. In the present invention, the pore diameter of the larger micropores is reduced so the larger micropores contribute significantly to the surface area. This can be accomplished by sizing such pores in the range of 100-600 Angstrom units and preferably in the 100-250 Angstrom units range. The smaller micropores provide the necessary surface area to accomplish desulfurization. Similarly we prefer to make the macropores formed by the channels between the grains be as small as possible without restricting diffusion into the pellets so as to increase surface area.

Having described the basic aspects of our invention, the following examples are given to illustrate specific embodiments thereof.

EXAMPLE 1

This example illustrates making a bidisperse micropore size catalyst support according to this invention which is substantially free of macropores (i.e. with a diameter greater than 600 Angstrom units).

A slurry of 450 grams of Davison SRA alumina in 950 ml of water was heated in a 2 liter autoclave at 175° C. for 4 hours. The alumina was dried at 110° C. The hydrothermal treatment increases the pore diameter of the alumina. Mixtures of the hydrothermally treated SRA and Catapal were used to prepare extrudates with bidisperse microporosity. In one procedure identified as Run A, 150 g of hydrothermally treated SRA were mixed with 150 g of Catapal and mulled with 170 ml of a 0.35% polyvinyl alcohol solution. In the second procedure identified as Run B, 193 g of hydrothermally treated SRA were mixed with 400 g of Catapal and mulled with 320 ml of a 0.6% polyvinyl alcohol solution. The pore structure of the 1/20 inch extrudates after calcination for 2 hours at 1400° F. is shown in FIG. 4. The macropore volume of these samples has been reduced to less than 0.07 cm³/g. The pore structures are set forth in Table 1.

EXAMPLE 2

This example demonstrates the flexibility in controlling the relative pore volumes of the two different size micropores to make catalyst supports.

Figure 5:
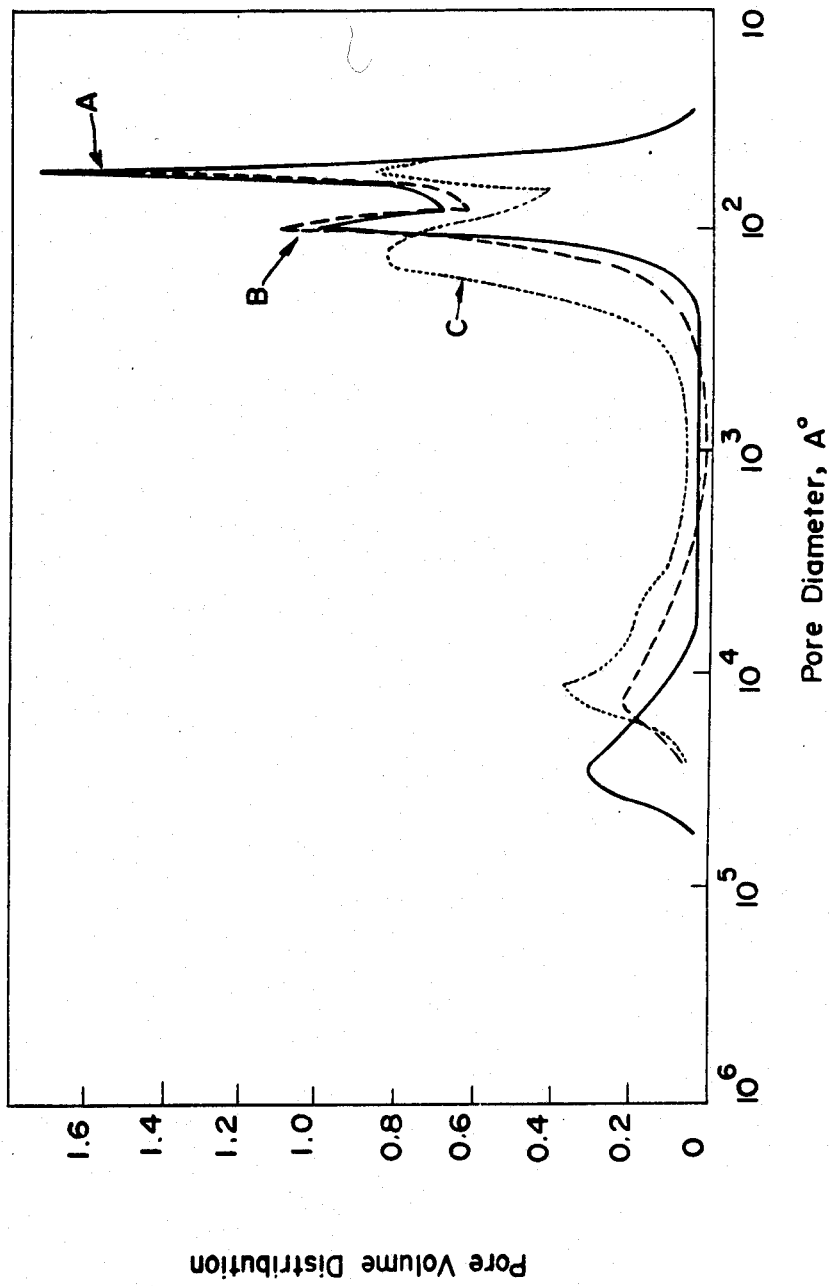
FIG. 5 is a graph illustrating the pore volume distribution versus the pore diameter for the bidisperse micropore size supports containing macropores.

Three bidisperse micropore size extrudates were prepared by combining varying amounts of calcined SRA (2 hours at 1750° F.) with uncalcined Catapal which is an alumina made by Conco Co. and which has micropores of around 30-80 Angstrom units. The extrudates labelled A, B and C contained respectively 10, 20, and 50% alumina from the calcined SRA. The extrudates were calcined for 2 hours at 1100° F. and their pore size distributions are shown in FIG. 5. The pore structures are set forth in Table 1.

EXAMPLE 3

This example illustrates that the bidisperse micropore size distribution support may be obtained by extrusion of powders of different chemical compositions.

Figure 6:
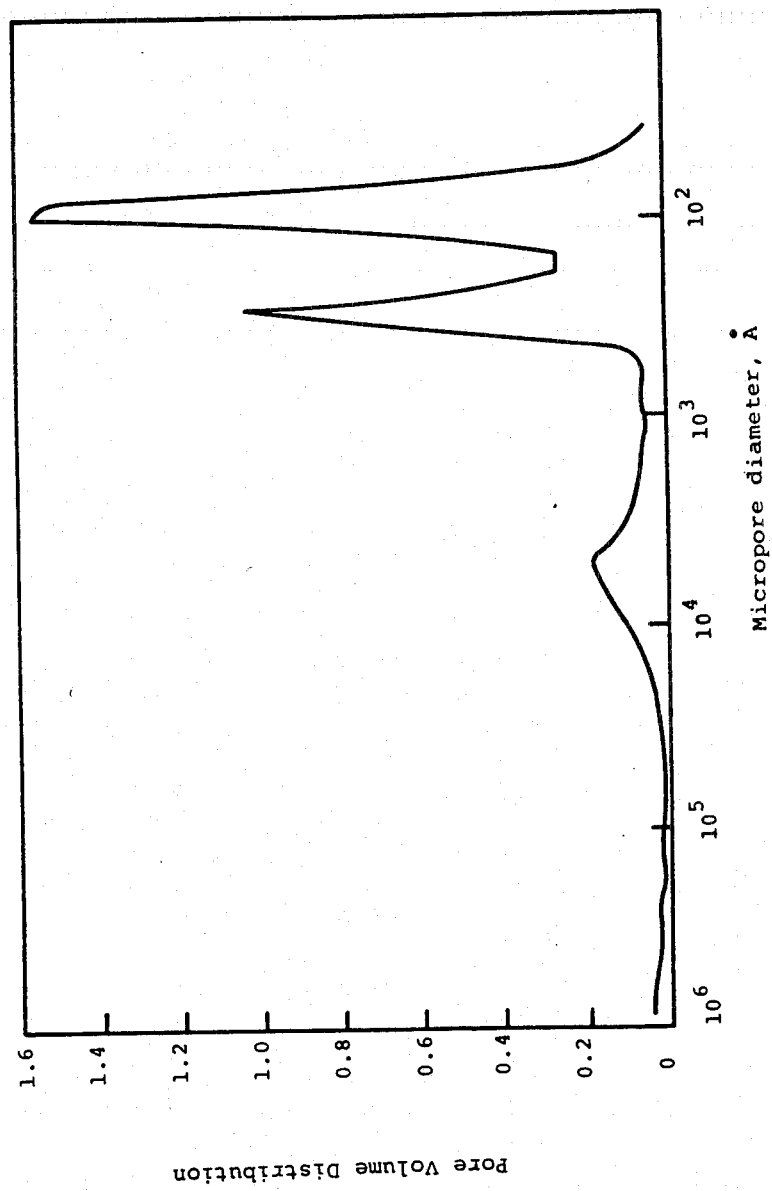
FIG. 6 is a graph illustrating the pore volume distribution versus the pore diameter for the bidisperse micropore size catalysts containing macropores.

Two hundred grams of SRA alumina were mixed with 86 grams of a large pore silica (Davison ACOD 243) in a Simpson Mix-Muller for 5 minutes. A solution of 16.3 ml of $HNO_3$ in 240 ml of water was added to the powder and mulling continued until the mixture turned to a soft paste. The paste was neutralized with 13.4 ml of concentrated $NH_4OH$ and extruded into 1/16 inch extrudates. The extrudates were calcined for 2 hours at 1600° F. The pore size distribution is shown in FIG. 6. There are two pore size distributions in the micropore regions. One has a pore diameter of about 341 Angstrom units and the other has a pore diameter of about 100 Angstrom units. The pore structure is set forth in Table 1.

TABLE 1

| Properties of Bidispersed Supports | | | | | | |
|---|---|---|---|---|---|---|
| | Example 1 | | Example 2 | | | |
| | A | B | A | B | C | Example 3 |
| $V_{larger}$, micro (cm$^3$/g) | 0.38 | 0.25 | 0.25 | 0.30 | 0.40 | 0.23 |
| $d_{larger}$ (AU) | 172 | 168 | 111 | 122 | 178 | 341 |
| $V_{smaller}$, micro (cm$^3$/g) | 0.17 | 0.24 | 0.22 | 0.19 | 0.14 | 0.42 |
| $d_{smaller}$ (AU) | 90 | 95 | 73 | 71 | 62 | 108 |
| $V_{macro}$ (cm$^3$/g) | 0.03 | 0.07 | 0.20 | 0.14 | 0.22 | 0.16 |
| BET surface area (m$^2$/g) | 164 | 161 | 211 | 205 | 190 | 182 |
| Pellet density (g/cm$^3$) | 1.113 | 1.129 | 0.998 | 1.046 | 0.931 | 0.842 |

Where AU is Angstrom Unit

EXAMPLE 4

A trimodal extrudate catalyst according to the present invention was made as follows.

SRA alumina powder which was prepared according to the method set forth in U.S. Pat. No. 4,154,812 was calcined at 1800° F. for 2 hours. Catapal alumina powder obtained from Conoco was separately impregnated with 14.7% $MoO_3$ and 3.3% CoO by the pore filling method with a solution of ammonium heptamolybdate and cobalt nitrate. The impregnated powder was dried at 230° F. A 50:50 by weight mixture (on an $Al_2O_3$ basis) of the calcined SRA powder and the impregnated Catapal was mulled together and extruded as 1/16" cylindrical extrudates. These extrudates were further impregnated with molybdenum and cobalt by spraying with a solution of ammonium heptamolybdate and cobalt nitrate such that the resulting catalyst had 12.9% $MoO_3$ and 3.0% CoO on a total catalyst basis. This catalyst was oven dried and calcined at 1100° F. for 3 hours. The physical properties are set forth in Table 2.

COMPARISON EXAMPLE 1

A bimodal extrudate catalyst was made as follows.
A commercially available 1/16 inch extrudate catalyst contained 16.7% $MoO_3$ and 3.9% CoO on a total catalyst basis.

The physical properties are set forth in Table 2. It is bimodal in the sense that it has micropores and much larger macropores. It does not have the micropore region divided into two zones.

COMPARISON EXAMPLE 2

A bimodal cylindrical extrudate of 1/16 inch diameter was prepared from SRA alumina. This support was calcined for two hours at 1600° F. and impregnated with a solution of crude phosphomolybdic acid and cobalt nitrate to obtain a catalyst having 15% $MoO_3$, 3.3% CoO and 1% P on a total catalyst basis. The catalyst was oven dried and calcined at 1000° F. for two hours. The physical properties are set forth in Table 2. Again, it is bimodal in the sense that it has micropores and much larger macropores, but it does not have the micropore region divided into two zones.

COMPARISON EXAMPLE 3

A commercially available unimodal catalyst having 14.4% $MoO_3$, 3.18% CoO, 9.9% $SiO_2$ and 0.11% P was obtained for comparison. This catalyst has a small micropore diameter of 78A. The physical properties are set forth in Table 2. It does not have any larger size pores to treat or carry in the large metal bearing molecules.

COMPARISON EXAMPLE 4

A bimodal cylindrical extrudate of 1/16 inch diameter was prepared from SRA alumina. The support was calcined for two hours at 1400° F. and impregnated with a solution of cobalt nitrate, ammonium heptamolybdate and citric acid to obtain a catalyst have 12.9% $MoO_3$, 2.9% CoO on a total catalyst basis. The catalyst was oven dried and calcined at 1000° F. for two hours. The physical properties are set forth in Table 2. The catalyst is bimodal in the sense that it has micropores and much larger macropores, but it does not have the micropore region divided into two zones.

TABLE 2

| COMPARISON OF CATALYST PROPERTIES | | | | | |
|---|---|---|---|---|---|
| | CATALYST | | | | |
| | Example 4 | Comp. Ex 1 | Comp. Ex 2 | Comp. Ex 3 | Comp. Ex 4 |
| $V_{micro}$, cm$^3$/g | 0.49$^a$ | 0.46 | 0.50 | 0.48 | 0.54 |
| smaller | 0.11$^b$ | | | | |
| larger | 0.38$^b$ | | | | |
| $d_{micro}$$^a$, (AU) | 100$^a$ | 94 | 143 | 78 | 111 |
| smaller | 64$^b$ | | | | |
| larger | 119$^b$ | | | | |
| $V_{macro}$, cm$^3$/g | 0.22 | 0.28 | 0.18 | — | 0.18 |
| $d_{macro}$, (AU) | 10,000 | 4000 | 3000 | — | 4000 |
| Pellet density (g/cm$^3$) | 0.98 | 0.95 | 1.04 | 1.26 | 0.98 |
| BET surface area (m$^2$/g) | 197 | 196 | 140 | 248 | 195 |
| Bulk density (g/cm$^3$) | 0.60 | 0.58 | 0.64 | 0.77 | 0.60 |

Where AU is Angstrom Unit $^a$Micropore volume and diameter are summations of the properties of the two micropore modes.

$d_{micro} = \frac{4 \times V_{micro}}{BET\ surface\ area}$ $^b$As explained in the text.

EXAMPLE 5

The catalysts according to Example 4 and Comparison Examples 1-3 prepared above were compared for their initial activity for sulfur and metals removal.

The catalysts were evaluated at a liquid hourly space velocity (LHSV) of 0.5 using a Lloydminster feed (the properties of which are set forth in Table 3) at a temperature of 750° F., a pressure of 1500 psi and a hydrogen circulation of 5000 scf/bbl. The stabilized initial activity comparisons after 36 hours of testing for sulfur, nickel and vanadium removal are set forth in Table 4.

TABLE 5

Comparison of Catalyst Performance as a Function of Days on Stream

| Days on Stream | Relative Activity for Nickel Removal | | | | Relative Activity for Vanadium Removal | | | | Relative Activity for Sulfur Removal | | | |
|---|---|---|---|---|---|---|---|---|---|---|---|---|
| | 10 | 20 | 30 | 35 | 10 | 20 | 30 | 35 | 10 | 20 | 30 | 35 |
| Example 4 | 100 | 91 | 83 | 80 | 100 | 88 | 83 | 81 | 100 | 80 | 70 | 69 |
| Comp. Ex. 1 | 72 | 65 | 64 | — | 71 | 65 | 64 | — | 107 | 84 | 81 | — |
| Comp. Ex. 2 | 91 | 80 | 73 | 71 | 89 | 81 | 72 | 71 | 93 | 72 | 70 | 69 |
| Comp. Ex. 3 | 79 | 56 | 53 | 52 | 64 | 44 | 43 | 43 | 112 | 75 | 64 | 60 |

TABLE 3

FEED PROPERTIES

| | Lloydminster Feed | Boscan Feed |
|---|---|---|
| Ni (ppm) | 71 | 160 |
| V (ppm) | 151 | 1600 |
| S (wt %) | 4.50 | 6.40 |
| Nitrogen (wt %) | 0.54 | 0.70 |
| CCR (%) | 16.5 | 18.9 |
| Asphaltenes (%) | 24.0 | 25.6 |
| API gravity | 7.4 | 5.4 |

TABLE 4

COMPARISON OF STABILIZED INITIAL ACTIVITIES LSHV 0.5

| Conversion (w %) of: | Catalyst | | | |
|---|---|---|---|---|
| | Example 4 | Comp. Ex. 1 | Comp. Ex. 2 | Comp. Ex. 3 |
| Sulfur | 76.7 | 63.7 | 63.8 | 66.1 |
| Vanadium | 79.2 | 62.9 | 62.9 | 46.2 |
| Nickel | 67.6 | 54.8 | 54.8 | 47.3 |

The catalyst of Example 4 according to the present invention is seen to be clearly superior for sulfur and metals removal. The two bimodal catalysts of Comp. Exs. 1 and 2 have similar micropore volumes as our catalyst of Example 4, but they do not have the micropore region divided into two zones as is the present catalyst with its bidisperse micropore size region having one mode with a diameter below 100 Angstrom units and a second mode, above 100 Angstrom units, having a diameter of 140 Angstrom units. These two comparison catalysts have similar activity, but in all instances they are not as selective as our catalyst.

The unimodal catalyst of Comp. Ex. 3 does not have the larger pores needed for demetalization and thus it is seen to have the lowest metals activity of all of the catalysts.

EXAMPLE 6

This example illustrates the durability testing of the catalysts.

The catalysts of Example 4 and Comparison Examples 1, 2 and 3 were compared for sulfur and metals removal for 40 days on stream. The conditions of the test were Lloydminster vacuum resid, 750° F., 1500 psi, 1.0 LHSV and a hydrogen circulation of 4000 scf/bbl. The relative activities of sulfur and metals removal as a function of time on stream are shown in Table 5.

The catalyst of the present invention in Example 4 shows superior performance in demetallation over all other catalysts tested and is only marginally less active to Comparison Example 1 in desulfurization after 30 days on stream.

EXAMPLE 7

This example illustrates another durability testing of the catalysts.

The catalyst of Example 4 and Comparison Example 4 were compared for sulfur and metals removal using a Boscan Feed, the properties of which are set forth in Table 3. The reactor was operated in the upflow mode and the conditions of the test were 750° F., 2000 psi, 1.0 LHSV and a hydrogen circulation of 4000 scf/bbl. The relative activities for sulfur and metals removal are shown in Table 6. The catalyst of the present invention in Example 4 shows superior demetallation and desulfurization performance and longer life than Comparison catalyst 4.

TABLE 6

Comparison of Catalyst Life
Boscan Feed, 750° F., 2000 psi, LHSV = 1 h$^{-1}$
H$_2$ circulation 4000 scf/bbl.

| Time on Stream (Days) | Relative Activity* | | | | | |
|---|---|---|---|---|---|---|
| | Example 4 | | | Comp. Ex. 4 | | |
| | Ni | V | S | Ni | V | S |
| 6 | 100 | 100 | 100 | 94.4 | 89.8 | 87.1 |
| 9 | 65.7 | 63.0 | 60.0 | 51.9 | 44.1 | 52.2 |
| 12 | 49.1 | 43.3 | 37.7 | 36.1 | 22.8 | 28.5 |
| 15 | 38.9 | 31.5 | 26.2 | 30.6 | 20.5 | 22.7 |

*Based on first order rate constant for metals removal and one and a half order rate constant for sulfur removal.

It is understood that the foregoing detailed description is given merely by way of illustration and that many variations may be made therein without departing from the spirit of this invention.

We claim:

1. A catalyst support having a bidisperse micropore size distribution where the micropores have an average pore diameter of less than 600 Angstrom units and being adapted for use as a hydrotreating catalyst support for treating heavy feeds containing large metal bearing molecules comprising a refractory oxide formed particle made of two different micropore size materials having
   (a) one small pore material being characterized as having a small micropore region having an average pore diameter of less than 100 Angstrom units; and
   (b) another material being characterized as having a large micropore region having an average pore diameter
      (i) which is less than 600 Angstrom units, (ii) which is equal to or larger than 100 Angstrom units, and (iii) which is much larger than the average diameter of the metal bearing molecules in a heavy feed to be processed;

the pore volume of the large micropore region comprising 10 to 90% of the total pore volume; and the pore volume of the small micropore region comprising 10 to 90% of the total pore volume.

2. A catalyst support according to claim 1, wherein the large micropores have an average pore diameter which is at least five times the average diameter of the metal bearing molecules in a heavy feed to be processed.

3. A catalyst support according to claim 1, wherein the large micropores have an average diameter between 100 and 250 Angstrom units.

4. A catalyst support according to claim 1, wherein the small and large micropore regions are made of two different materials.

5. A catalyst support according to claim 4, wherein the small micropore region is made of alumina and the large micropore region is made of silica.

6. A method of making a catalyst support adapted for use as a hydrotreating catalyst for treating heavy feeds containing large metal bearing molecules and having a bidisperse micropore size distribution where the micropores have an average pore diameter of less than 600 Angstrom units comprising (a) forming particles of a refractory oxide powder made of two different micropore size materials having (i) one small pore material being characterized as having a small micropore region having an average pore diameter of less than 100 Angstrom units; and (ii) another material being characterized as having a large micropore region having an average pore diameter (i) which is less than 600 Angstrom units, (ii) which is equal to or larger than 100 Angstrom units, and (iii) which is much larger than the average pore diameter of the metal bearing molecules in a heavy feed to be processed;

the pore volume of the large micropore region comprising 10 to 90% of the total pore volume; and the pore volume of the small micropore region comprising 10 to 90% of the total pore volume; and (b) calcining the particles to form a catalyst support.

7. A method according to claim 6, wherein the powder comprises a mixture of two powders where one provides the small micropore region and the other provides the large micropore region.

8. A method according to claim 7, wherein the two powders are made of different materials.

9. A method according to claim 8, wherein one powder is made of alumina to provide small micropore region and the other powder is made of silica to provide the large micropore region.

* * * * *

UNITED STATES PATENT AND TRADEMARK OFFICE
CERTIFICATE OF CORRECTION

PATENT NO. : 4,791,090
DATED : December 13, 1988
INVENTOR(S) : Carmo Joseph Pereira and Wu-Cheng Cheng It is certified that error appears in the above-identified patent and that said Letters Patent is hereby corrected as shown below:

On the front page correct entry [75] to read:

[75] Inventors: Carmo J. Pereira; Wu-Cheng Cheng, both of Columbia, Md.

Signed and Sealed this

Eighteenth Day of April, 1989

Attest:

DONALD J. QUIGG

*Attesting Officer*   *Commissioner of Patents and Trademarks*